(12) United States Patent
O'Brien et al.

(10) Patent No.: US 7,291,237 B2
(45) Date of Patent: Nov. 6, 2007

(54) METHOD OF MAKING TIRE HAVING WEAR INDICATORS

(76) Inventors: John Michael O'Brien, 9385 SW. Iowa Dr., Tualatin, OR (US) 97062; Patrick Michael O'Brien, 1670 SW. Sunset Blvd., Portland, OR (US) 97239

( * ) Notice: Subject to any disclaimer, the term of this patent is extended or adjusted under 35 U.S.C. 154(b) by 260 days.

(21) Appl. No.: 11/087,711

(22) Filed: Mar. 24, 2005

(65) Prior Publication Data

US 2006/0213593 A1   Sep. 28, 2006

(51) Int. Cl.
B29D 30/52 (2006.01)
B60C 11/24 (2006.01)
(52) U.S. Cl. .................... 156/110.1; 73/146; 152/154.2
(58) Field of Classification Search ................. 73/146; 156/110.1; 152/154.2
See application file for complete search history.

(56) References Cited

U.S. PATENT DOCUMENTS

| | | | |
|---|---|---|---|
| 2,102,784 A | 12/1937 | Bridges | |
| 2,706,509 A | 4/1955 | White | |
| 3,261,338 A | 7/1966 | Kovac | |
| 3,362,376 A | 1/1968 | Norton | |
| 3,516,467 A | 6/1970 | Sims | |
| 3,578,055 A | 5/1971 | French | |
| 3,653,422 A | 4/1972 | French | |
| 3,770,040 A | 11/1973 | DeCicco | |
| 3,814,160 A | 6/1974 | Creasey | |
| 3,929,179 A | 12/1975 | Hines | |
| 3,933,036 A * | 1/1976 | Lippmann et al. | 73/146 |
| 4,074,742 A | 2/1978 | Chamblin | |
| 4,144,921 A | 3/1979 | Yabuta et al. | |
| 4,226,274 A | 10/1980 | Awaya et al. | |
| H1283 H | 2/1994 | Porto et al. | |
| 5,303,756 A | 4/1994 | Hill | |
| 5,573,611 A | 11/1996 | Koch et al. | |
| 5,704,999 A | 1/1998 | Lukich et al. | |
| 5,749,984 A | 5/1998 | Frey et al. | |
| 5,788,335 A | 8/1998 | O'Brien | |
| 5,801,304 A * | 9/1998 | Cantu et al. | 73/146 |
| 5,810,451 A | 9/1998 | O'Brien | |
| 5,874,670 A * | 2/1999 | Doda et al. | 73/146 |
| 6,003,576 A | 12/1999 | Auxerre et al. | |
| 6,022,082 A | 2/2000 | O'Brien | |
| 6,023,967 A * | 2/2000 | Chung et al. | 73/146 |
| 6,044,313 A | 3/2000 | Gannon | |
| 6,062,283 A | 5/2000 | Watanabe et al. | |
| 6,076,035 A | 6/2000 | Yanase | |
| 6,093,271 A | 7/2000 | Majumdar | |

(Continued)

FOREIGN PATENT DOCUMENTS

DE   4122648   1/1993

(Continued)

Primary Examiner—Steven D. Maki
(74) Attorney, Agent, or Firm—Michele V. Frank; Patton Boggs LLP

(57) ABSTRACT

A tire in which a tire manufacturer has determined the tractive capacity at numerous levels of tread wear, the tire having at least one visual warning indicator located at a tread depth corresponding to a percentage loss of tractive capacity. Also, a method of making the tire and a method improving traffic safety through use of such a tire combined with educating the consumer as to proper use of the tire.

7 Claims, 4 Drawing Sheets

U.S. PATENT DOCUMENTS

| | | |
|---|---|---|
| 6,131,633 A | 10/2000 | Slivka |
| 6,220,199 B1 | 4/2001 | Williams |
| 6,244,666 B1 | 6/2001 | O'Brien |
| 6,298,889 B1 | 10/2001 | Smith |
| 6,343,676 B1 | 2/2002 | Achmad |
| 6,386,252 B1 | 5/2002 | O'Brien |
| 6,523,586 B1 | 2/2003 | Eromäki et al. |
| 6,630,885 B2 | 10/2003 | Pyne et al. |
| 6,634,222 B2 | 10/2003 | O'Brien et al. |
| 6,709,138 B1 | 3/2004 | Johnson |
| 6,912,896 B2 * | 7/2005 | Levy et al. .................. 73/146 |
| 2003/0131660 A1 | 7/2003 | O'Brien |
| 2003/0158803 A1 | 8/2003 | Darken et al. |
| 2003/0205076 A1 | 11/2003 | Shimura |
| 2005/0081971 A1 * | 4/2005 | Heinen .................. 152/209.1 |
| 2006/0037683 A1 * | 2/2006 | Cuny et al. ............. 152/154.2 |

FOREIGN PATENT DOCUMENTS

| | | |
|---|---|---|
| DE | 4405265 A1 | 8/1995 |
| DE | 19733260 A1 | 2/1999 |
| DE | 19733620 | 2/1999 |
| DE | 19949396 | 11/2000 |
| DE | 19935255 | 2/2001 |
| EP | 0667251 | 8/1995 |
| FR | 2834933 | 7/2003 |
| GB | 2216851 A | 10/1989 |
| GB | 2243584 A | 11/1991 |
| GB | 2262489 A | 6/1993 |
| GB | 2265586 A | 10/1993 |
| GB | 2268715 A | 1/1994 |
| GB | 2269347 | 2/1994 |
| GB | 2276130 A | 9/1994 |
| GB | 2297297 A | 7/1996 |
| GB | 2303590 A | 2/1997 |
| GB | 2326625 A | 6/1997 |
| GB | 2312654 | 11/1997 |
| GB | 2347393 A | 6/2000 |
| GB | 2375743 A | 5/2001 |
| GB | 2361219 A | 10/2001 |
| GB | 2376002 A | 12/2002 |
| GB | 2385305 A | 8/2003 |
| GB | D 3015108 | 6/2004 |
| GB | 2399061 A | 9/2004 |
| JP | 57167806 A | 10/1982 |
| JP | 58012809 A | 1/1983 |
| JP | 57209406 A | 12/1983 |
| JP | 59011903 A | 1/1984 |
| JP | 60193705 A | 10/1985 |
| JP | 60222304 A | 11/1985 |
| JP | 03031007 A | 2/1991 |
| JP | 03038416 A | 2/1991 |
| JP | 05286316 A | 2/1993 |
| JP | 08104113 A | 4/1996 |
| JP | 08258517 A | 10/1996 |
| JP | 10044719 A | 2/1998 |
| JP | 10076814 A | 3/1998 |
| JP | 11245620 A | 9/1999 |
| JP | 2004/114998 A | 4/2004 |
| JP | 2004/203318 A | 7/2004 |
| WO | WO98/03358 | 1/1998 |
| WO | WO99/06228 | 2/1999 |
| WO | WO02/70288 A1 | 2/2002 |
| WO | WO2004/045872 A1 | 3/2004 |

* cited by examiner

METHOD OF MAKING TIRE HAVING WEAR INDICATORS

FIELD OF THE INVENTION

The present invention is generally directed to improved traffic safety and specifically to tires having end of performance tread indicators for visual identification of potential performance and safety issues.

BACKGROUND OF THE INVENTION

Tires play a critical role in the safety of drivers and passengers. According to the Oregon State Police, "tires are the single most important mechanical component of vehicle control and safe driving." As the only part of the vehicle in contact with the road surface, tires must provide traction and stability under diverse driving conditions. Further, the tires must provide traction and stability for various types of vehicles.

The behavior of tires on wet or snowy surfaces is of considerable interest from a safety point of view since many accidents occur on slippery roads. It is known that tire performance can be impacted by vehicular speed, surface texture and depth of precipitation on the road. However, it is a tire's tread pattern, tread depth, tread material, air pressure and intended use that has the most impact on performance in adverse conditions.

The effects of tread pattern and tread wear on wet surfaces have been studied experimentally by a number of investigators, and have been shown to play a significant role in road adhesion on common road surfaces and in various weather conditions. Generally, tires with more ribs and sipes perform better than those with fewer, and tires with more remaining tread perform better than those with less. Excessively warn, smooth, or close patterned tires do not provide the escape paths for water making hydroplaning more likely in wet conditions and do not provide adequate channels for grabbing and evacuating snow in winter conditions.

Materials used in the manufacture of tires also play a significant role in tire performance in wet conditions. Tires designed for longer life typically use more natural rubber as the base polymer for the tread compound. Tires designed for improved rolling resistance, and performance typically use more synthetic rubber as the base compound for tread design. The natural rubber compounds offer higher abrasion resistance, synthetic rubber compounds offer a higher value of coefficient of road adhesion, particularly on wet pavements. Typically commercial truck tires will be designed for durability and long life, while many passenger car tires are designed for better performance. Performance, however, is always important regardless of the use.

Today tire manufacturers have the technology and capability to design and manufacture tires with specific functions in mind. Today's market is filled with "All Season", "Off the Road", "Light Truck", "Performance", "Comfort", "Winter", "Run Flat", and "Commercial" tires. Within each market segment, engineers develop tread designs and use specific materials for an intended outcome. "Performance" tires will use a specific tread design and material base to improve traction, while a "Commercial" truck tire will be designed for durability and longevity for highway driving. In some instances, tires are designed with multiple functions. For example, the shoulder regions are designed for summer traction with deep channels to evacuate water while the middle rib is made of a highly siped, low durometer rib for winter traction on ice and snow. Tires do not perform equally in common conditions, yet safety and performance concerns remain consistent.

As important as tires are to transportation safety basic maintenance, performance and replacement issues are easily overlooked. Tires worn to the point at which expected performance drastically declines, is irregular, or excessive for any driving condition need to be identified.

Today's modern vehicle is complex and difficult for an individual to maintain independently. Individuals changing their own oil, or spark plugs is a thing of the past. Tire maintenance, however, is still the responsibility of the vehicle owner. Currently, there are three methods available for evaluating a tires remaining tread depth: (1) tread depth gauge or penny, (2) wear bars and (3) evaluation by a mechanic or tire dealer.

To measure tread depth with a tread depth gauge, the user inserts a probe into a groove and pushes a flange on the device flush against the tread. The depth of the tread is then read from a calibrated plunger or dial. To measure tread depth with a penny, the user inserts a penny into a groove with Lincoln's head in the groove. If part of Lincoln's head is always covered by the tread, there is more than 2/32" of tread depth remaining.

Wear bars are narrow bands of rubber in the grooves across the tire tread that indicate when tires are worn out. They are built in to every tire and will show up when only 2/32" of tire tread remains. If wear bars are visible, new tires are needed as soon as possible.

For those consumers who are unfamiliar with the penny test and unwilling to learn how to use a tread depth gauge, the only other choice is to bring their motor vehicle to a mechanic or a tire dealer for evaluation. Not only is this expensive, the consumer must rely on the honesty of the mechanic or tire dealer. Although the majority of mechanics and tire dealers are honest, they have a significant financial incentive to encourage the consumer to replace tires that may still have valuable tread.

While the above tools may be effective for someone who understands how and when to use them, they have been shown to be ineffective for most of the marketplace. Industry and government efforts to educate the public on tire safety, including monthly checks of tire pressure and tire tread, are extensive. Yet, over half of all drivers cannot identify a wear bar,[1] two out of three drivers do not know how to judge when a tire is bald,[2] and nine percent of vehicles on the road today have at least one bald tire.[3]

[1] RMA Survey, February 2002 (FrederickPolls).
[2] RMA Tire Safety Fact Sheet 2004
[3] Department of Transportation HS 809 359, October 2001

Therefore, it would be desirable to have a tire with continuously visually obvious tread wear indicators that visually identifies various stages of wear, demands attention, creates social pressure for action and results in improved traffic safety.

SUMMARY OF THE INVENTION

This invention relates to a system designed to improve traffic safety by helping to identify when a tire has lost significant traction in wet or snowy conditions. It is also designed to improve traffic safety by identifying irregular tread wear. This invention further improves traffic safety by providing the ability to easily observe and remove dangerously worn tires from public roads and highways. A preferred method to achieve this goal is the implementation of a system that allows for a visual assessment of remaining tread depth on a continuous basis. This is accomplished through the use of visual indicators that become apparent when the tires are worn to specific plies. Preferably, the depth of the visual indicators is established by the manufacturer or other controlling agency. With this system in place, consumers will be warned of their tire's decreased performance in wet or snowy conditions, will be warned of irregular tire wear before a tragic event occurs, and will be given the tools to identify and remove from use dangerously worn tires. Furthermore, the system will give retailers and manufacturers a tool for assessing the condition of tires that are returned under warranty.

The present invention provides a tire in which a tire manufacturer has determined the tractive capacity, defined in more detail in the detailed description of the invention below, at a plurality of level of tread wear, the tire having at least one visual warning indicator located at a first tread depth corresponding to a predetermined percentage loss of tractive capacity.

In one aspect of the invention, the tire includes as least a second visual warning indicator. The second visual warning indicator indicates that the tire is no longer safe under any condition or is no longer covered by the manufacturer's warranty. In another aspect of the invention, the first visual warning indicator indicates a substantial loss of tractive capacity. A substantial loss of tractive capacity may vary from tire to tire. Representative losses in tractive capacity include 20% or more, 35% or more, 50% or more, and 75% or more. In another aspect of the invention, a series of visual warning indicators is placed in the tire at depths to indicate incremental 10% losses in tractive capacity. In still another aspect of the invention, the visual indicators indicates irregular wear.

The present invention also provides a method of making a tire having warning indicators comprising measuring the tractive capacity of an unworn sample tire, measuring the tractive capacity of the sample tire at a plurality of stages of wear, determining the depth of tread wear at which the sample tire suffers a predetermined percentage loss of tractive capacity, and fabricating a tire with wear indicators located at predetermined levels of tread depth corresponding the depth of tread wear at which the sample tire suffers a predetermined percentage loss of tractive capacity.

In one aspect of the invention, the tractive capacity comprises determining a traction property on a given surface on a given surface. The traction property includes stopping distance, stopping force, stopping energy, coefficient of sliding friction, stopping time, or hydroplaning resistance. In another aspect of the invention, the predetermined surface includes dry pavement, packed snow, loose snow, loose sand, packed sand, and oil coated pavement. The invention further includes a tire made according to any of the aforementioned inventive methods.

The present invention also provides a method of improving traffic safety comprising providing tires having at least one visual warning indicator located at a first tread depth corresponding to a predetermined percentage loss of tractive capacity, and informing consumers as to the purpose of the at least one visual warning indicator. In one aspect of the invention, the step of informing customers comprises including an explanation of the visual indicators in marketing materials The present invention also includes a method of making a tire having warning indicators comprising measuring the performance capacity of an unworn sample tire, measuring the performance capacity of the sample tire at a plurality of stages of wear, determining the depth of tread wear at which the sample tire suffers a predetermined percentage loss of performance capacity, and fabricating a tire with wear indicators located at predetermined levels of tread depth corresponding the depth of tread wear at which the sample tire suffers a predetermined percentage loss of performance capacity.

In another aspect of the invention, the performance property comprises a measure of a traction property, heat generated, pressure change, or hydroplaning resistance.

DETAILED DESCRIPTION OF THE INVENTION

Figure 1:
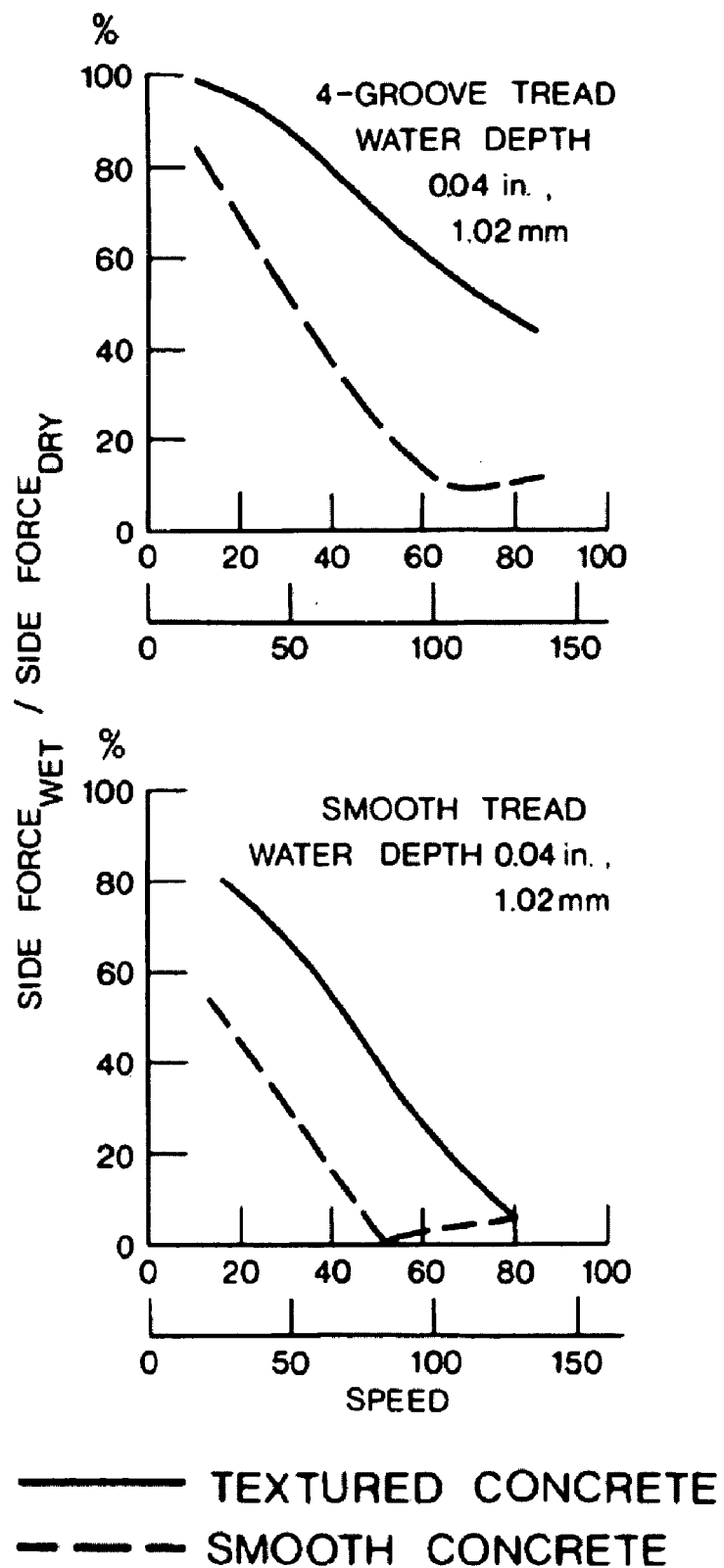
FIG. 1 is a plot illustrating the effect of tread design and surface conditions on the degradation of cornering capabilities of tires on wet surfaces.

Today the performance of each type of tire manufactured can be tested at every point during its useful life. Testing conducted at each level of tire wear allows all manufacturers to clearly identify the acceptable level of remaining tread depth for all their lines of tires and at what remaining tread depth each specific tire becomes unsafe to use. Embodiments of the present invention will allow all tire manufacturers to utilize a visual identifier at a point when it has been determined by the manufacturer that it is no longer safe to use a tire on public roadways. As such, a much higher level of public understanding and safety for consumers is provided when compared to the outmoded and ineffective "one depth fits all" tread wear identification systems currently in use. The following factors with respect to the invention will now be discussed, continuous observation and warning indicators.

1. Continuous Observation

To reasonably incorporate into general use a system to measure or observe tread depth, tread depth indicators should be accurately and reliably viewable while on the vehicle whether stationary or moving. Preferably, the indicators should be observable from a reasonable distance away from the tire at issue. The present invention provides a continuous observation method that preferably includes (1) visual representations as to warn of declining tire performance in inclement conditions, (2) consistent placement of the observable indictors accurately reflecting remaining tread depth, and (3) intuitive public awareness as to the meaning of the tread wear indication system. As such, the indicators preferably uniquely represent a tire condition that should be known to the public.

In September 2004, a national survey was conducted on behalf of Smart Tread, LLC ("ST"), by Penn Shoen & Berland Associates, Inc. This survey queried 900 consumers who were given nothing more than a verbal description of tires with colorized tire tread wear identification. As part of that survey participants were queried as to their current method for determining when to replace their tires. The following responses were provided:

8% use the "penny test"
23% check the tires wear bars
26% rely on the advice of a mechanic or tire retailer
36% replace their tires when the feel that they need to be When asked the likelihood of purchasing a tire that tells them when to replace their tires through the use of a colorized tread wear indication system, 62% responded positively. This response clearly indicates a desire for an invention incorporating visual indictors, preferably colored, to warn of declining tire performance.

2. Warning Indicators

A visual warning indicator in itself has multiple functions that will have a positive impact on transportation safety. There can be early warning indicators that indicate when a tire's performance has been reduced to the point where it is no longer safe for use in inclement weather or end of life indicators that indicate that the tire is not safe under any driving conditions.

A. Early Warning Indicators

Early warning indicators can indicate end of life. However, other unique forms of early warning indicators are contemplated by this invention. First, when applied at specific ply depths depending on the intended use of a specific tire, it can be used as a wet or snowy weather performance indicator. Second, it can be used for the identification of irregular wear caused by some vehicular malfunction or tire maintenance issue. Thirdly, it can be used as a warning giving the driver time to replace the tire before worn to a point that it is no longer safe to use.

Figure 2:
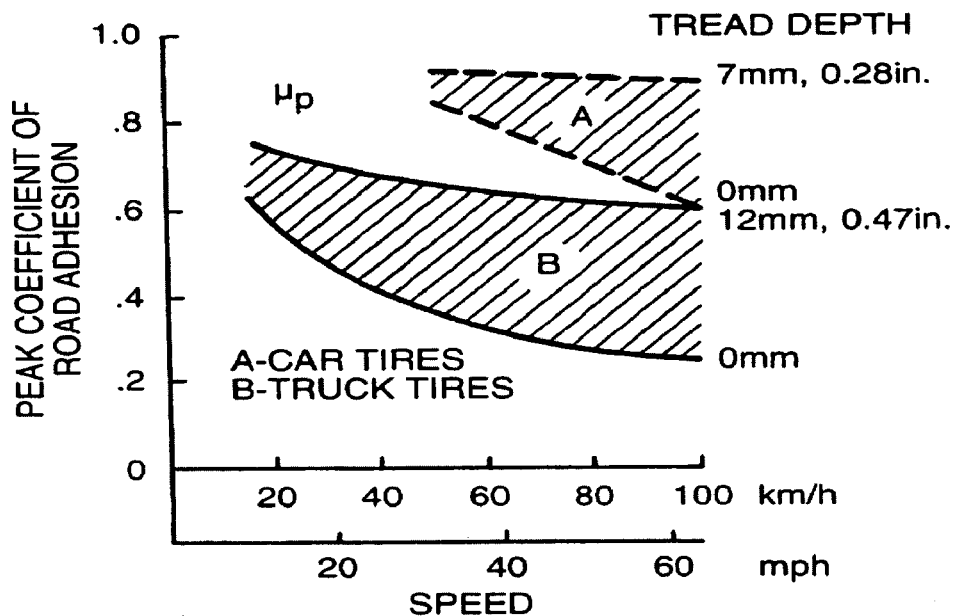
FIG. 2 is a plot illustrating the difference in performance between synthetic and natural rubber as shown by peak coefficient of road adhesion on wet surfaces.
Figure 3:
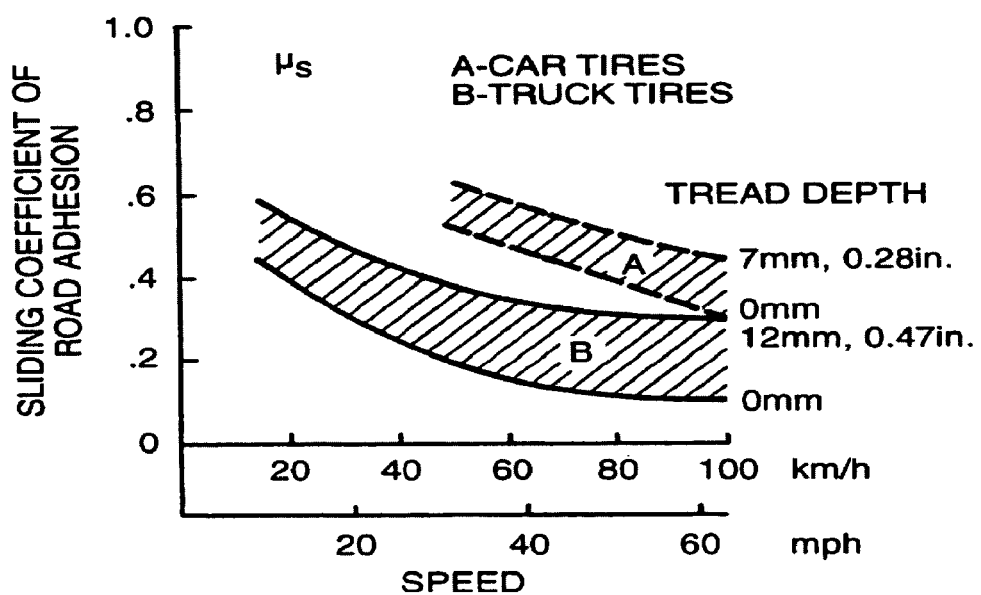
FIG. 3 is a plot illustrating the difference in performance between synthetic and natural rubber as shown by sliding coefficient of road adhesion on wet surfaces.

For new tires, the U.S. Department of transportation currently requires that tires be given a rating for three performance measures including: (1) winter and wet weather traction, (2) heat resistance, and (3) treadwear. While the heat resistance and treadwear measures retain some meaning as the tire wears, the winter and wet weather traction measure becomes increasingly meaningless. The tire's tread channels water in wet or slushy conditions, enhancing traction in snowy conditions. The tread design (FIG. 1), materials used (FIGS. 2 and 3) and intended purpose of the tire has a direct impact on the test results, and hence, the rating received during the certification process. Once rated, a tire will be marketed for certain attributes. These attributes impact the consumer's expectations of how a tire will perform in wet or wintry conditions. However, every tire as a matter of function will wear and at some point in its use reach tread depth levels that will have a significant negative impact on performance in these situations.

Low tire tread increases stopping distances in wet or snowy conditions and is a primary cause of hydroplaning. Further, low tire tread has different consequences depending upon the road conditions. What is adequate on dry roads may be inadequate on wet and snowy roads. Moreover, depending on the tread design, materials used, and tire pressure, the point at which performance is impacted varies from tire to tire. The most significant impact of low tread in wet weather is the reduction in the coefficient of road adhesion between the tire and the ground. This reduction in the coefficient of road adhesion effects braking, steering control, and directional stability. A tire with ribs designed for evacuating water or snow and uses synthetic rubber has a high coefficient of road adhesion and will out perform those tires with fewer ribs and more natural rubber in wet conditions when new. Further, a tire with a higher coefficient of road adhesion will reach the point at which wet or winter driving is adversely effected by tread depth at a deeper level of wear.

Tire manufacturers have the capability to test and rate new tires. The invention proposes that manufacturers can also provide testing and evaluation on tires as they wear. By implementing the same testing regiment through a tire's life span, it is contemplated that the manufacturer, for example, would designate the point at which a tire's performance is significantly impacted in wet or snowy conditions. A manufacturer, for example, could then place a visual indicator that warns a driver that his tire has lost 10%, 20%, 30% or any other percentage of it's performance in wet or wintry conditions.

On average a new tire will be sold with $10/32$'s of an inch of tread. According to a recent Consumer Reports study, a typical all season tire with only $5/32$'s of an inch of tread has a significant decrease in performance when driven in wet or snowy conditions. In regions where wet and wintry weather is common, drivers should consider replacing these tires well before the point at which the tires are considered bald. To do so, drivers need to be educated and have better tools to aid them in the decision to replace worn tires.

Vehicular or tire maintenance issues such as tire balance, under/over inflation, suspension and alignment problems can be identified through specific wear patterns. These wear patterns are often not noticed but could be identified through the use of the warning indicator used for wet and wintry performance criteria before a tragic event occurs.

A warning indicator is extremely useful if for no other reason than to give the driver adequate time to replace tires before they are no longer safe to use. To create a comprehensive warning indicator, a tire manufacturer will identify a performance related tread depth for each tire. At this tread depth a visual indicator will be employed to warn the driver as to unsafe tire conditions.

B. End of Use Indicators

Every tire manufacturer currently employs wear bars at $2/32$'s remaining tread as means to identify when a tire is no longer safe to use. Once these bars are visible at the tread surface, a tire's warranty is commonly void, and the tires are generally accepted as "bald" or no longer safe to use. However, based on surveys conducted by the Rubber Manufacturers Association and AAA it has been shown that less than half of all drivers know what wear bars are and nearly two thirds of all drivers could not identify when tires need to be replaced. According to the National Highway Traffic Safety Administration, nearly 23 million cars are driving on the road today with at least one tire that would be considered bald and dangerous to use by government standards.

However, the $2/32$'s standard is insufficient for many tires, especially when driven in inclement weather. As technology changes and further data is collected regarding the performance of tires, it is apparent that many tires may not be safe to use before they reach $2/32$'s of an inch. As discussed above, many tires show a significant reduction in performance in wet and snowy conditions even with $5/32$'s remaining tread depth.

SPECIFIC EMBODIMENTS

Figures 4, 5:
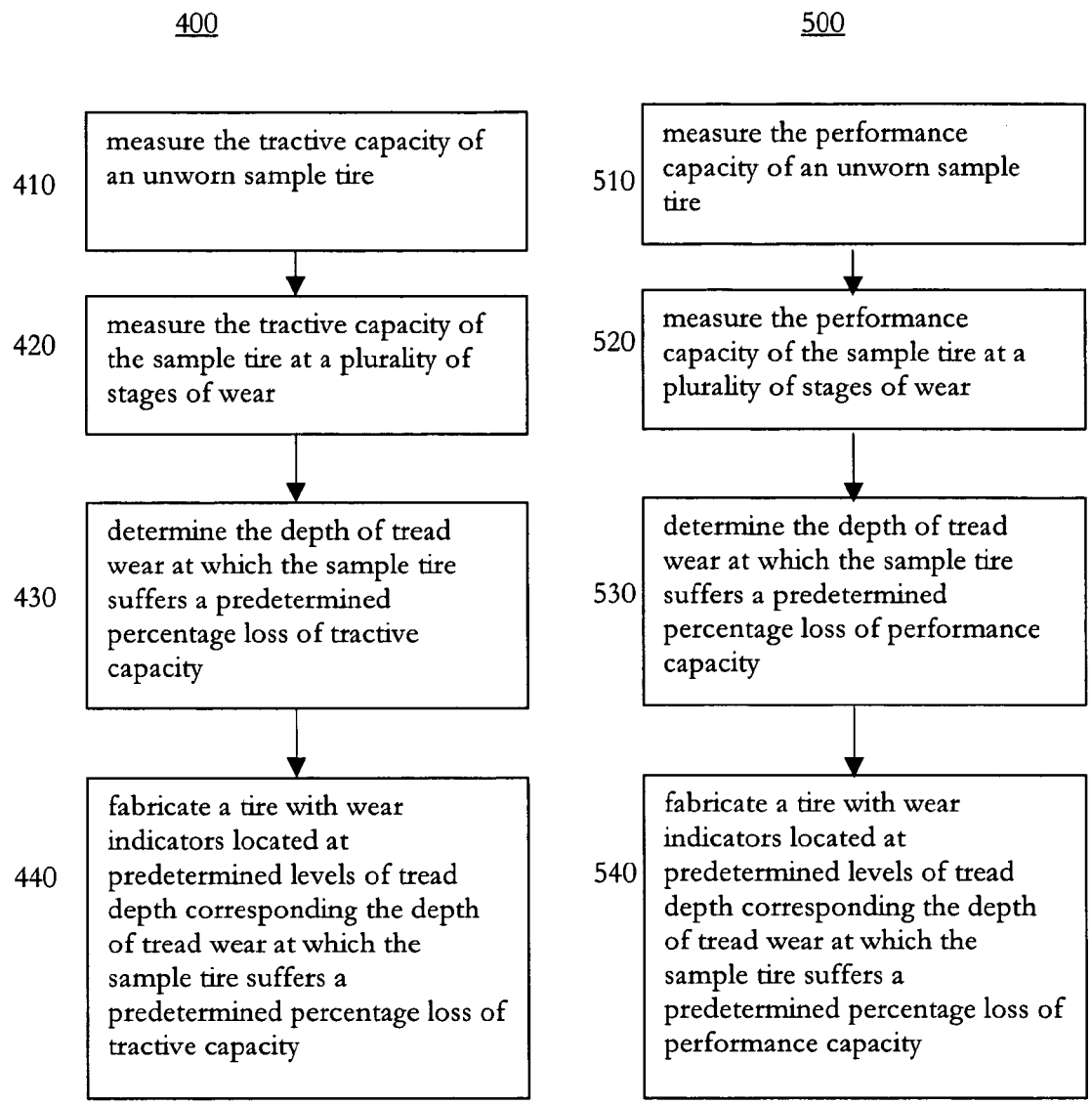
FIG. 4 is a flow chart illustrating a method according to one embodiment of the invention.
FIG. 5 is a flow chart illustrating a method according to another embodiment of the invention.

FIG. 4 illustrates a method 400 of making tires having warning indicators according to one embodiment of the invention. The method 400 generally includes the steps of measuring the tractive capacity of an unworn sample tire 410, measuring the tractive capacity of the sample tire at a plurality of stages of wear 420, determining the depth of tread wear at which the sample tire suffers a predetermined percentage loss of tractive capacity 430, and fabricating a tire with wear indicators located at predetermined levels of tread depth corresponding the depth of tread wear at which the sample tire suffers a predetermined percentage loss of tractive capacity 440.

In the first step 410 of this embodiment, a manufacturer measures the tractive capacity of an unworn sample tire. A manufacturer according to this embodiment of the invention can be any maker of tires. Tractive capacity is typically determined by measuring a traction property of the tire. In one aspect of this embodiment, the tractive capacity is determined according to ASTM F-408-99. Per this specification, two properly inflated tires are mounted on a "skid trailer" towed behind a vehicle. The trailer is towed at a constant speed across a wet surface by the vehicle. Breaks are applied to the tires mounted on the trailer until one or both test tire(s) are locked. As the tires are dragged across the test surface, sensors mounted on the trailer measure the breaking force generated at the tire-road interface. From the breaking force data, the sliding break force coefficient and the peak tire breaking force coefficient can be calculated. Any of the breaking force, sliding break force coefficient, or peak tire breaking force coefficient may be used as a measure of tractive capacity. In other aspects of the invention, the tractive capacity is determined according to ASTM E-1337-90 (2002), ASTM E-1136, ASTM F-1805 or any other specification or test devised to measure a traction property of a tire.

In another preferred embodiment of the invention, the measured traction property is stopping distance. That is, the distance a test vehicle traveling at a given velocity will travel before coming to a stop after the tires are locked. Other traction properties encompassed by this invention include stopping energy (the energy expended in bringing a test vehicle traveling at a given velocity to a stop), stopping time, hydroplaning resistance or any other property related to the traction of the tire on the given surface.

Regarding the test surface, in one preferred embodiment of the invention, the test surface is wet asphalt. In another preferred embodiment, the test surface is wet concrete. Other test surfaces encompassed by the present invention include, but are not limited to, dry pavement, packed snow, loose snow, loose sand, packed sand, oil coated pavement, or any other surface that is representative of actual tire use.

The second step 420 of the method 400 of making tires having warning indicators is to measure the tractive capacity of the sample tire at a multiplicity of stages of wear. That is, a small amount of tire is worn away and then the tractive capacity is remeasured. This is repeated numerous times, preferably at small stages of wear. Given the data from the measurements of the first 410 and second steps 420 of the method, it is now possible to move to the third step 430 of the method 400. In the third step 430 the percentage loss of tractive capacity is determined by dividing the tractive capacity at the multiplicity of stages of wear by the initial tractive capacity of the unworn tire and converting to percentage. In the fourth step 440, a tire is designed and fabricated with visual indicators at predetermined levels of loss of tractive capacity.

In one embodiment of the invention, a single visual indicator is placed in the tire to indicate a substantial loss in tractive capacity. What constitutes a substantial loss in tractive capacity may vary with the intended use of the tire. Any percentage deemed appropriate by the manufacturer, either alone or in conjunction with an automobile manufacturer, can be selected. It is an advantage of the present invention that a visual indicator can be located at a given loss of tractive capacity across numerous makes and models of tire. With a tire according to any of the embodiments of the invention, the consumer automatically knows the actual loss of performance when viewing the visual indicator rather than an arbitrary loss of tread thickness as in the prior art. With this knowledge, the consumer can modify his or, her driving practice in inclement weather to factor in the loss of performance of the tires. It is not necessary for the consumer to guess how the tire will react based on the amount of lost of tread. The tires are normalized as a function of performance rather than tread loss.

In one embodiment of the invention it is preferable that the indicator be placed at a depth that indicates a 20% loss in tractive capacity. In another embodiment, it is preferable that the indicator indicates a loss of 35% tractive capacity. In another embodiment, it is preferable for the indicator to indicate a loss of 50% tractive capacity. In still another embodiment, it is preferable for the indicator to indicate a loss of 75% tractive capacity.

In another embodiment of the invention, a series of visual indicators any be placed at depths to indicate successive loses tractive capacity. In one preferred embodiment of the invention, visual indicators are placed at depths indicating successive losses of 10% tractive capacity. Typically, the tractive capacity does not vary linearly with tread depth. Further, the tractive capacity loss as a function of tread depth will tend to vary with each type of tire. Thus, unlike prior methods of using visual indicators that were placed based upon tread depth at regular intervals unrelated to performance, this embodiment incorporates visual indicators placed to indicate losses of tractive capacity. This provides a distinctive advantage to the user as the visual indicators are much more closely linked to the safe use of the tire. That is, as each successive visual indicator is uncovered, the consumer will accurately know the loss of performance of the tires, especially on wet or snowy roads. With this knowledge, the consumer can continually modify his or her driving practice in inclement weather to factor in the loss of performance of the tires.

FIG. 5 illustrates a method of making tires having warning indicators 500 according to another embodiment of the invention. This embodiment of the invention is similar to the embodiment illustrated in FIG. 4, however, this embodiment is not limited to tractive capacity. In step 510 of this embodiment, a performance capacity of an unworn tire is measured. The performance capacity includes any property that can be measured and linked to the performance of the tire. The performance capacity includes tractive capacity as well as performance properties such as the heat generated during breaking and pressure changes in the tire while breaking.

In step 520, the performance capacity is measured at a multiplicity of stages of wear. As with the measurement of tractive capacity, this is repeated numerous times, preferably at small stages of wear. In the third step 530, the percentage loss of performance capacity is determined by dividing the performance capacity at the multiplicity of stages of wear by the initial performance capacity of the unworn tire and converting to percentage. In the fourth step 540, a tire is designed and fabricated with visual indicators at predetermined levels of loss of performance capacity.

Figure 6:
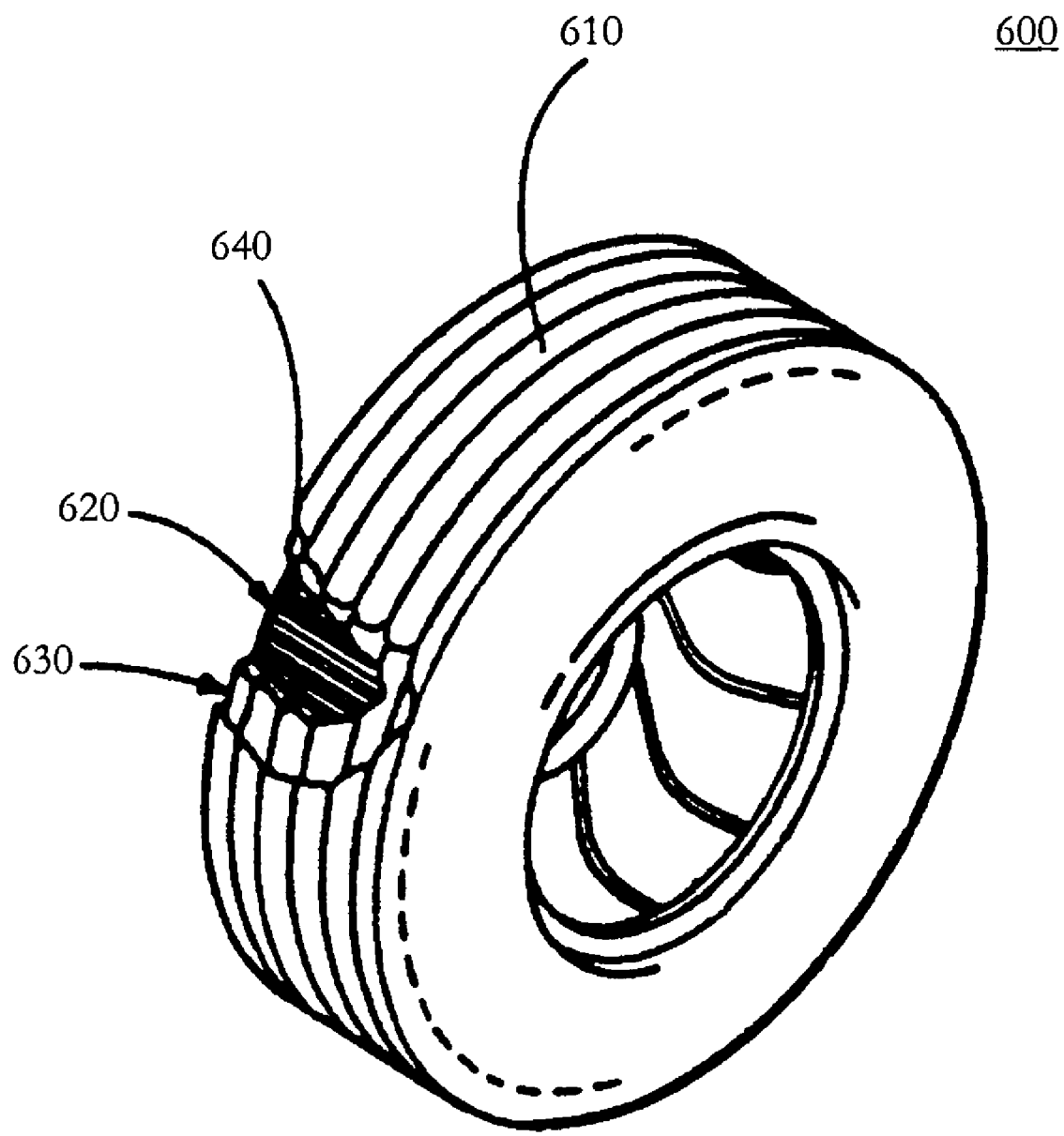
FIG. 6 is a perspective view of a tire that indicates a loss in performance due to tread wear by changing color according to one embodiment of the invention.

FIG. 6 illustrates a tire 600 according to a preferred embodiment of the invention. In this embodiment, the manufacturer has measured the tractive capacity of a representative tire at a multiplicity of levels of tread wear and determined the percentage loss of tractive capacity as a function of tread wear. In this embodiment, the manufacturer has fabricated a tire 600 having a tread portion 610 with two warning indicators 620, 630 covered by regular tread 640. The warning indicators 620, 630 may be colored plies, preferably different color from each other. In one preferred embodiment of the invention, the first warning indicator 630 is a yellow colored ply and indicates a substantial loss in tractive capacity. When the first warning indicator 630 is visible, the tire 600 is no longer safe to drive in wet or snowy conditions. However, the tire 600 is still safe for use in dry conditions. The second warning indicator 620 is preferably a red ply. When the second warning indicator 630 is visible, the tire 600 is not longer safe for use under any conditions. In another embodiment of the invention, the second warning indicator 620 indicates that the tire 600 is not longer covered by the manufacturers warranty.

A further embodiment of the invention includes a method of improving traffic safety. This method includes the steps of providing consumers with tires having at least one visual warning indicator that indicates a loss of performance capacity and the step of informing consumers as to the purpose of the at least one visual warning indicator. The step of informing consumers may be accomplished, for example, by including an explanation in the manufacturer's marketing materials. In this manner, consumers are virtually assured of understanding the purpose of the visual indicators and the consequences of ignoring the visual indicators. Armed with this knowledge and the tires, the consumers can make intelligent decisions regarding driving in inclement weather and replacing worn tires, rendering public roads safer.

Embodiments of the invention illustrate a method by which a tire manufacturer may develop a system using current standards of testing for traction, and technologies available (be it colored silica, colored fabric, reflective silica granules, or electrical means) to manufacture tires that will create continuously obvious, easily understood visual tread wear indicators. Tires made by these methods have the advantage that can educate and alert the driver as to the decreased performance of a tire, allowing the driver to provide for significantly increased stopping distances in wet or snowy conditions. Further, with these tires, consumers can identify irregular tread wear before potential tire failure occurs. Additionally, the methods allow for the identification of when a tire is worn beyond the manufacturers recommendations. The methods further allow for the tire manufacturer to visually identify a more stringent application of end of life conditions than required by law. Through education, the methods encourage proactive replacement of tires, improving public safety. Additionally, the methods provide safety officials a way to identify tires that have been worn beyond the legal limit in a jurisdiction where such laws or regulation exist.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the embodiments of the invention and its practical application. It is intended that the claims and terms thereof be interpreted to protect the invention to the broadest extent permitted by the prior art and the applicable law. Moreover, features described in connection with one embodiment of the invention may be used in conjunction with other embodiments, even if not explicitly stated above. Additionally, Applicants make no admission that any of the cited articles and methods in the foregoing description of the invention are prior art, and they expressly reserve the right to demonstrate, where appropriate, that these articles and methods do not constitute prior art under the applicable statutory provisions.

What is claimed is:

1. A method of making a tire having warning indicators comprising:

measuring the performance capacity of an unworn sample tire;

measuring the performance capacity of the sample tire at a plurality of stages of wear;

determining the depth of tread wear at which the sample tire suffers a predetermined percentage loss of performance capacity using the measurements of performance capacity of the unworn sample tire and the measurements of performance capacity of the sample tire at the plurality of stages of wear; and fabricating a tire with wear indicators located at predetermined levels of tread depth corresponding to the depth of tread wear at which the sample tire suffers a predetermined percentage loss of performance capacity.

2. The method of claim 1, wherein performance capacity comprises determining a tire performance property on a given surface.

3. The method of claim 2, wherein the performance property comprises a measure of a traction property, heat generated, pressure change, or hydroplaning resistance.

4. A method of making a tire having warning indicators comprising:

measuring the tractive capacity of an unworn sample tire;

measuring the tractive capacity of the sample tire at a plurality of stages of wear;

determining the depth of tread wear at which the sample tire suffers a predetermined percentage loss of tractive capacity using measurements of the tractive capacity of the unworn sample tire and measurements of the tractive capacity of the sample tire at the plurality of stages of wear; and fabricating a tire with wear indicators located at predetermined levels of tread depth corresponding to the depth of tread wear at which the sample tire suffers a predetermined percentage loss of tractive capacity.

5. The method of claim 4, wherein tractive capacity comprises determining a traction property on a given surface.

6. The method of claim 5, wherein the traction property comprise a measure of stopping distance, stopping force, stopping energy coefficient of sliding friction, stopping time, or hydroplaning resistance.

7. The method of claim 5, wherein the predetermined surface comprises dry pavement, packed snow, loose snow, loose sand, packed sand, and oil coated pavement.

* * * * *